(12) United States Patent  (10) Patent No.: US 8,892,742 B2
Tsao  (45) Date of Patent: *Nov. 18, 2014

(54) CONCURRENT WEB BASED MULTI-TASK SUPPORT FOR COMPUTING SYSTEM

(75) Inventor: Sheng Tai (Ted) Tsao, San Jose, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,807

(22) Filed: Apr. 17, 2012

(65) Prior Publication Data

US 2012/0203870 A1  Aug. 9, 2012

Related U.S. Application Data

(63) Continuation of application No. 12/075,314, filed on Mar. 4, 2008, now Pat. No. 8,799,473, which is a continuation of application No. 10/713,904, filed on Aug. 6, 2002, now Pat. No. 7,418,702.

(51) Int. Cl.
  *G06F 15/173*  (2006.01)
  *H04L 12/24*  (2006.01)
  *G06F 9/52*  (2006.01)
  *G06F 9/54*  (2006.01)
  *H04L 29/08*  (2006.01)

(52) U.S. Cl.
  CPC ............ *H04L 41/0806* (2013.01); *G06F 9/526* (2013.01); *G06F 9/54* (2013.01); *H04L 67/02* (2013.01); *H04L 67/10* (2013.01)
  USPC ............ 709/226; 709/219; 709/229; 718/100

(58) Field of Classification Search
  None
  See application file for complete search history.

(56) References Cited

U.S. PATENT DOCUMENTS

| | | | |
|---|---|---|---|
| 5,873,085 A * | 2/1999 | Enoki et al. ............................ 1/1 |
| 6,584,454 B1 * | 6/2003 | Hummel et al. ................. 705/59 |
| 7,447,738 B1 * | 11/2008 | Andrews et al. ............. 709/204 |
| 7,584,261 B1 * | 9/2009 | Teodosiu et al. ............. 709/217 |
| 2003/0005110 A1 * | 1/2003 | Corbin et al. ................. 709/224 |
| 2004/0172336 A1 * | 9/2004 | Forsell et al. .................. 705/26 |

* cited by examiner

*Primary Examiner* — Mohamed Ibrahim

(57) ABSTRACT

The traditional file transferring between multiple computing devices in a computer network requires multiple login. In addition, traditional file transferring in a web based environment is lack of web multitasking support. Therefore, when transfer of a file with a larger size, the problem of lacking of web multitasking support will be escalated and become much more apparent and severe. For example to transfer a Gigabytes sized file could cause a displaying of web based user interface to be blocked and hanged. Present invention has successfully solves both issues by introducing the central controlled distributed scalable virtual machine and a web multitasking mechanism.

15 Claims, 7 Drawing Sheets

Console support in a Simple Environment

Data traveling between a web-console and the console supporting software a) Data Path 1:
Referred as sending data from the web-console-to the console support software or referred as the console supporting software receiving data from the web-console.

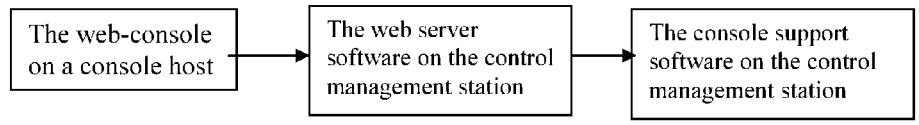

b) Data Path 2: (reverse path)
Referred as sending data from the console supporting software to the web-console or referred as web-console receiving data from the console supporting software.

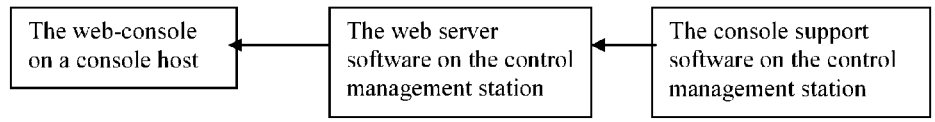

Fig. 3

Basic Task & Operation Processing Flow Chart in a CCDSVM environment.

The abstract data structure for supporting multiple concurrent tasks and operations in a CCDSVM environment.

The typical hardware components of a computing device such as a control management station, a system units, and a console host.

CONCURRENT WEB BASED MULTI-TASK SUPPORT FOR COMPUTING SYSTEM

CROSS-REFERENCES TO RELATED APPLICATION(S)

This application is a continuation application of (a) U.S. patent application Ser. No. 12/075,314 filed on Mar. 4, 2008, now U.S. Pat. No. 8,799,473, which itself in turn is a continuation application of U.S. patent application Ser. No. 10/713, 904 filed on Aug. 6, 2002 and is converted from provisional application 60/401,238, and now is a U.S. Pat. No. 7,418,702. All above applications are herein incorporated by reference in their entireties for all purpose.

FIELD OF THE INVENTION

The present invention generally relates to support web based multitasking for a single computing device or for a plurality of computing devices of a central controlled distributed scalable virtual machine system ("CCDSVM") with respect to a web based computer user work environment.

BACKGROUND OF THE INVENTION

A typical computer system provides a computer user work environment to end users, wherein the computer user work environment runs on top of a generic computer operating system. With this work environment, an end user can login to the system and. setup various computer resource access controls based on his or her permitted role. Therefore, the end user, for example, can configure computer resources such as disks, networks, file folder/directory systems, and others. Also, various computer tasks & operations can be executed by the computer application; and the computer operating system of a system provides the results of tasks to the end user. Specially, with a generic computer operating system, this computer user work environment allows each of a plurality of concurrent users to run multiple concurrent tasks or operations simultaneously.

The computer user work environment has evolved from paper tape & punch card environment, command line environment on a native system to window & mouse click environment on a native system in the past. This invention provides users a web-based computer user work (operating) environment on top of generic operating system for a single or multiple computers, and allows each of the users access to one or multiple computing systems through a conventional web-browser.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings:

FIG. 3 illustrates an example of basic data flow between a web-console on a console host and the console supporting software in a control management environment.

BRIEF DESCRIPTION OF THIS INVENTION

The traditional web server or other server (3 of FIG. 1) may support a user from a web browser (8 of FIG. 1) screen displayed on a computing device somewhere on the network to perform tasks of accessing the server, where the task could get quick response and could be finished in a short period of time, for example, checking a web server's status or getting the server's other information, etcetera. However, the traditional web server does not support for multiple simultaneous concurrent tasks or operations from the same web-browser, such problem will be escalated and manifested to people, especially when these tasks are time consuming to finish.

Figure 1:
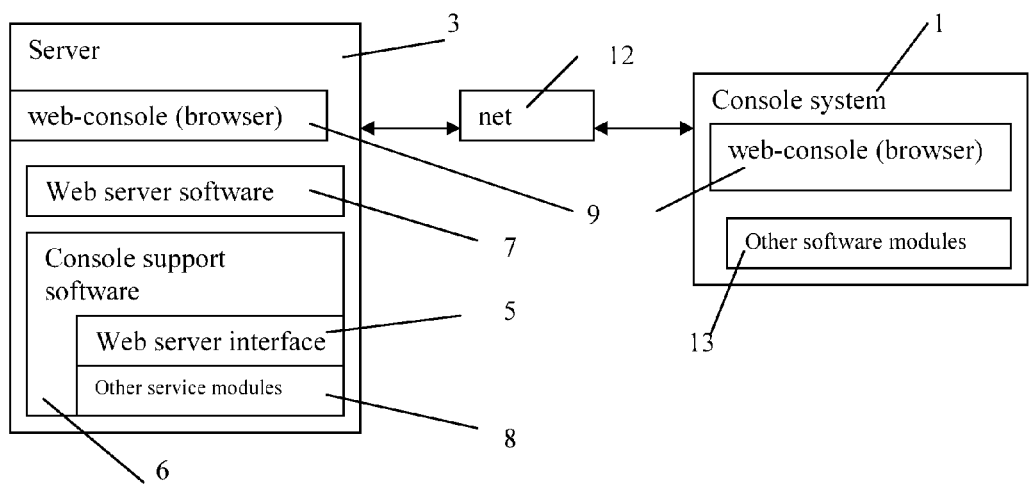
FIG. 1 illustrates an example of a simplified multi-tasks support on Web-console in a simple environment.

For example, creating a 60 GB file system on the server, or configuring a raid controller on that server 3 illustrated in FIG. 1 is such a time consuming task. Because these tasks often take a large amount of time to be finished, and such tasks will experience hanging and blocked in the web-console (web browser) screen on a console host 1 illustrated in FIG. 1. As a result, no other tasks could be performed in parallel from the same web-console at the same time. This caused by the hidden problem of lack of web based multitasking support in the traditional web based system. In addition, traditional console supporting software does not work for a more complicated environment such as the CCDSVM environment illustrated in FIG. 2.

Figure 2:
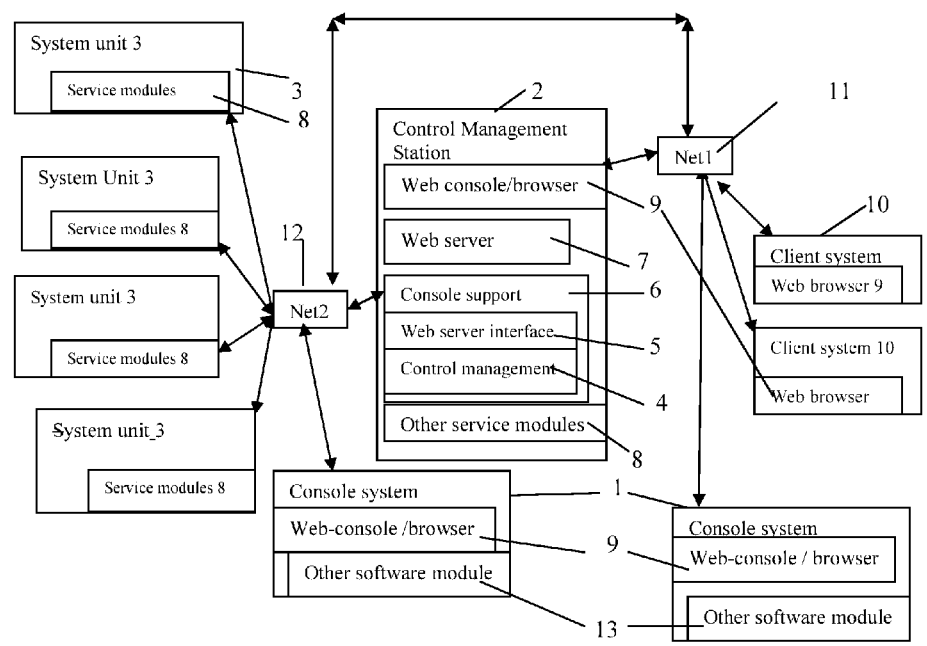
FIG. 2 illustrates an example of a simplified multi-tasks support on Web-console in a CCDSVM environment.

To solve these problems and effectively to support multiple simultaneous concurrent tasks in a web-console for both the simple computing environment as illustrated in FIG. 1 and the CCDSVM environment, the console supporting software 6 illustrated in FIG. 1 needs to include additional control management software modules 5 illustrated in FIG. 2 and others. As illustrated in FIG. 2, the control management software module 5 shall communicate and control all system units 3 and each of the system units 3 needs service software modules 8 to communicate with control management software 4 of console support software 6.

Figure 5:
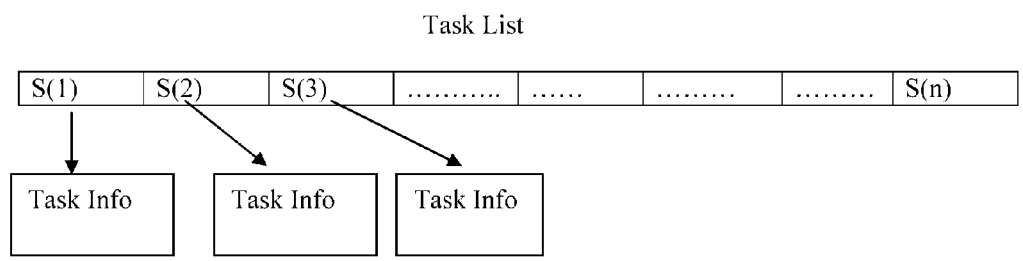
FIG. 5 illustrates a user space task list, which represents an abstraction of data structure, for controlling multiple simultaneous concurrent tasks and operations in the CCDSVM environment.

In addition, a user space task list illustrated in FIG. 5 could be used together with conventional or non-conventional locks to support all multiple simultaneous concurrent tasks and operations. With this invention, the multi-tasks support for the web-console in a simple computing environment shown in FIG. 1 has been viewed as a special case of such support in a CCDSVM environment shown in FIG. 2. The CCDSVM will be degenerated into the simple server) if there is no multiple system units 3 that are illustrated in FIG. 2.

These and other features, aspects and advantages of the present invention will become understood with reference to the following description, appended claims and accompanying figures set forth below.

DETAILED DESCRIPTION OF THE INVENTION

The CCDSVM in a embodiment is configured to provide a control management station ("control system") to control a group of computing systems and provide distributed services to at least one client system across Intranet, the Internet as well as a LAN environment. The software components of the CCDSVM form a virtual operating environment.

When a server provides software support to allow a user, via a web-browser on a computing system (device) such as a desktop, laptop, server, PDA, or cell phone, access to and manage the server, this web-browser is often referred as a web-console. With the CCDSVM, a permitted user from the web-console should be able to access and operate the entire CCDSVM.

To simplify the discussion, the term of thread and process are roughly used without differentiation between them in this invention regardless of the very restricted definition of the thread and process in the field of computer science. Here both thread and process are basically referred as a sequence of instructions based on a piece of program code that starts to be executed by a computer system step by step to carry out a computer task.

Lock is a mechanism that allows a thread to look a computer resource for its own use and prevents other threads from access to the same computer resource at the same time. There is conventional lock which can be acquired and released by the same thread. The conventional lock mechanisms have used by most software developer crossing the software industry. The lock described in this invention may or may not be a conventional one. The non-conventional lock mechanisms created in this invention can be acquired by one thread and may be released by same thread or by another thread. Therefore, it is non-conventional lock serving threads on the computing system.

FIG. 1 illustrates an example of a web-console scheme in a simple computing environment that includes a console host 1, a server 3, and a communication network 12. The console host 1 further includes a web-console 9 (a browser). The server 3 includes a native web-console 9, a web server software 7, and a console support software 6, where the console support software 6 further includes web server interface 5 and other service modules 8. It should be noted that the same reference indicators will be used throughout the drawings and the following description to refer to the same or like items.

The console host 1, from which a user is able to perform system tasks or operations for the server 3 through the web-console (browser) 9. The console host 1 can be any computing system on the network 12 such as a server, a desktop PC, a laptop PC, a hand held PDA, or a cell phone. The web browser 9 may be commercially available software from any vendor or a proprietary software. The web browser 9 is able to handle web protocol such as HTTP. The console host 1 may also include other software modules 13 that may be implemented with any suitable programming languages such as C, C++, Java, XML, et cetera. The other software modules 13 are used to communicate between the server 3 and the console host 1 using IP, non-IP or any suitable protocols for receiving and/or sending data between the console host 1 and the server 3.

The server 3 could be a web server or any kind of computing system with web server software that includes web server software 7 and console supporting software 6. The console supporting software 6 includes web server interface 5 and other services software modules 8, where the other services software 8 is operated natively on the server 3. The web server software 7 may be a commercially available software or proprietary software, which is able to accept and handle the web protocol such as HTTP. A native web-console (browser) 9 enables a user to access and operate the server computer 3 locally.

Net 12 represents a network infrastructure such as Internet, intranet, and (LAN). The net 12 includes all kind of related network equipment and media such as switches/routers, and different kind of connecting cables and wireless communication media.

FIG. 2 shows an example of a simplified block diagram for an embodiment of the CCDSVM. The CCDSVM system includes console hosts 1, a control management station 2, system units 3, networks of net1 11 and a net2 12, and client systems 10. The console hosts 1 could be any computing system on the network such as a server, a desktop PC, a laptop PC, a hand held PDA, or a cell phone. A web browser 9 of the console host 1 can be used access to and operate the entire CCDSVM. The web browser 9 may be commercially available software from any vendor or proprietary software company. The web browser 9 is able to handle web protocol such as HTTP. A difference between a web-console 9 and a web browser is that the web-console 9 allows a user access to system information and performing system operation over computing systems such as in the CCDSVM environment.

The console host 1 may also include other software modules 13, which may be implemented with any suitable programming languages such as C, C++, Java, XML etc. These software modules 13 may be used to facilitate communications between the control management station 2 and the console hosts 1 using IP, non-IP or any suitable protocols for receiving or sending data between the console host 1 and the control management station 2. To support a non-web-based networked console, the software configured for the web console 9 shall be capable of handling protocols other than web protocols such as deploying HTTP for communicating with the console supporting software 6 on the control management station 2.

The control management station 2 could be any computing system on the network such as a server, a desktop PC, a laptop PC, or others. The control management station 2 includes web server software 7 and console supporting software 6. The console supporting software 6 includes web server interface software modules 5 and control management software modules 4. It should be noted that the console supporting software 6 may includes others service software modules. It may also have a native web browser used as a native web-console 9. The web server software 7 discussed earlier could be commercially available software from a major vendor or other proprietary software that is able to accept and handle the web protocol such as HTTP. The web server software 7 sends data to and receives data from the web-console 9 of the console hosts 1.

The console supporting software 6 can be implemented with any suitable languages such as C, C++, Java, XML, etc. or even implemented by using a combination of different languages as long as it provides the features and functionality described in this invention. That means it is language independent. In addition, the communication protocol used between the console support software 6 and the service software modules 8 of the system units 3 could be any suitable protocol such IP based, or non-IP based or other protocols.

There may be several fixed threads being created based on the control management software modules 4. There are may be various number of threads that are created based on the web server interface software modules 5 for supporting each of tasks submitted by a user via operation menu displayed in the web-console 9. All of these threads may be communicated with each other through inter-process communication and are simply referred as the thread of the console supporting software 6. However, to simplify the discussion, they may be just referred as the console supporting software 6 without mentioning the thread at all.

If there is a need to support a less effective non-web-based networked console, there is no need for the web server software 7 and web server interfacing software module 5 being employed. Instead, an additional network software module is required that could be implemented with any suitable programming language and any suitable communication protocol other than web protocol (HTTP). This network software module can communicate with networked console software on the console host 1 across a communication network and can communicate with the rest of the console supporting software 6 via inter-process communication mechanism.

The system unit 3 could be any computing system on the network such as a server, a desktop PC, a laptop PC, a hand held PDA, a cell phone, and any operational system. The server could be a video server, a web server, a storage block data server (SAN unit), a video monitoring device, and so forth without limits. The system unit 3 contains service software modules 8 that are capable of communicating with the outside world. For example, the service modules 8 is used to communicate with the control management software 4 of the control management station 2 for carrying out the tasks distributed from the control management station 2, or to communicate with the clients 10 of the CCDSVM for delivering services to them, or to communicate with another system unit 3 for transferring the data. The service software modules 8 could be implemented with any suitable programming languages such as C, C++, Java, or others. It should be noted that the communication protocol could be any suitable protocol such as IP (Internet Protocol) base or other non-IP based protocol.

The net1 11 represents any kind of communication links between the control management station 2 and the web-console 9 or the client hosts 10. The net1 11 could be an infrastructure of internet, intranet, LAN or others that comprises connection media such as cables of Ethernet, optical Fiber, and/or other, wireless media, bus, and includes communication equipment such as switches, routers, and/or adapters.

The net2 12 also represents a communication infrastructure comprising communication media and equipment that are similar to the net1 11 has, except for providing communication between the control management station 2 and the system units 3 or the web-consoles 9 across the infrastructure of internet, intranet, LAN, WAN, or other.

The client systems 10 are not part of the CCDSVM but they may requests services from the CCDSVM as shown in FIG. 2. The role of the client systems and the connections between the client system 10 and system unit 3 will not be described in this invention since they are irrelevant to this invention.

FIG. 3 illustrates a simplified data flow between the web-console 9 on the console host 1 of FIG. 2 and the console supporting software 6 on the control management station 2 of FIG. 2. Data travel from the web-console 9 to the console supporting software 6 includes two steps. First, the data goes from the web-console 9 to the web server software 7 of FIG. 2 via the net 11 or 12 of FIG. 2. Second, the console supporting software 6 obtains the data from the web server software 7 of FIG. 2 via inter-process communication. To simplify the discussion of this invention, this data traveling path will simply refer to as the console supporting software 6 obtains the data from the web-console 9 or refer to as the data being sent from the web-console 9 to the console supporting software 6.

Data traveling from the console supporting software 6 to the web-console 9 includes two reverse steps. First, the web server software 7 gets the data from the console supporting software 6 via inter-process communication. Second, the web server software 7 sends data to the web-console 9 via the net 11 or 12. To simplify the rest of discussion, this reverse data traveling will refer to as data being sent from the console supporting software 6 to the web-console 9 or refer to as the web-console 9 gets data from the console supporting software 6. In addition, the terms of data may also be referred as information, or information on a web page and they will be used interchangeably herein.

Figure 4:
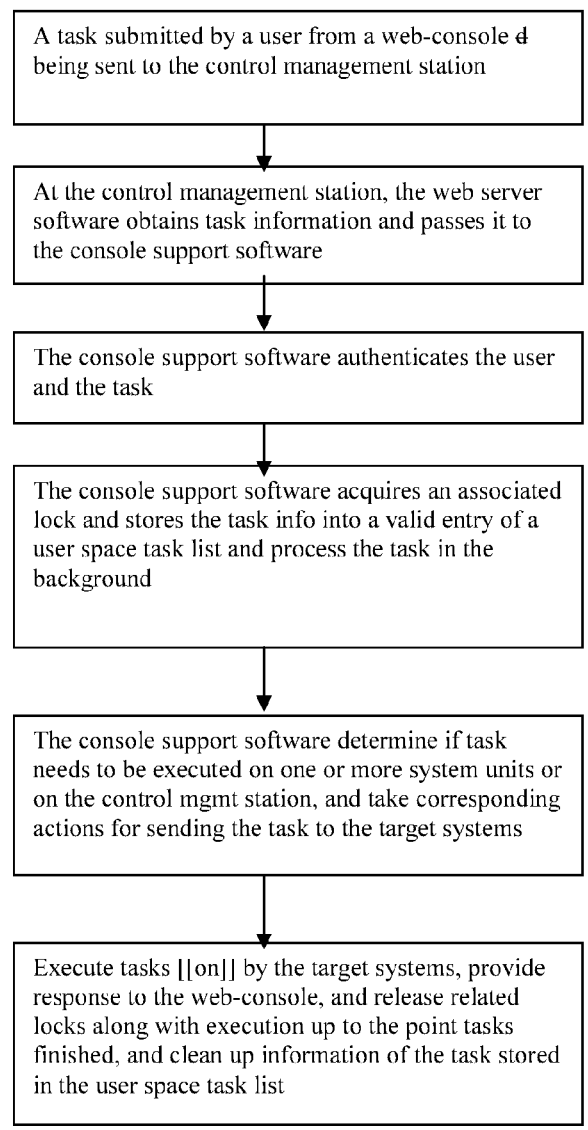
FIG. 4 illustrates an example of operation processing flow for a task submitted in the CCDSVM environment.

FIG. 4 shows the basic tasks and operation processing flow chart, which initiated from the web-console 9.

FIG. 5 shows one embodiment of a user space task list. Each entry on the user space task list can be used to store information of a task for the task received from the web-console 9. The stored information of the task in the entry will be deleted upon the task execution is completed.

Figure 6:
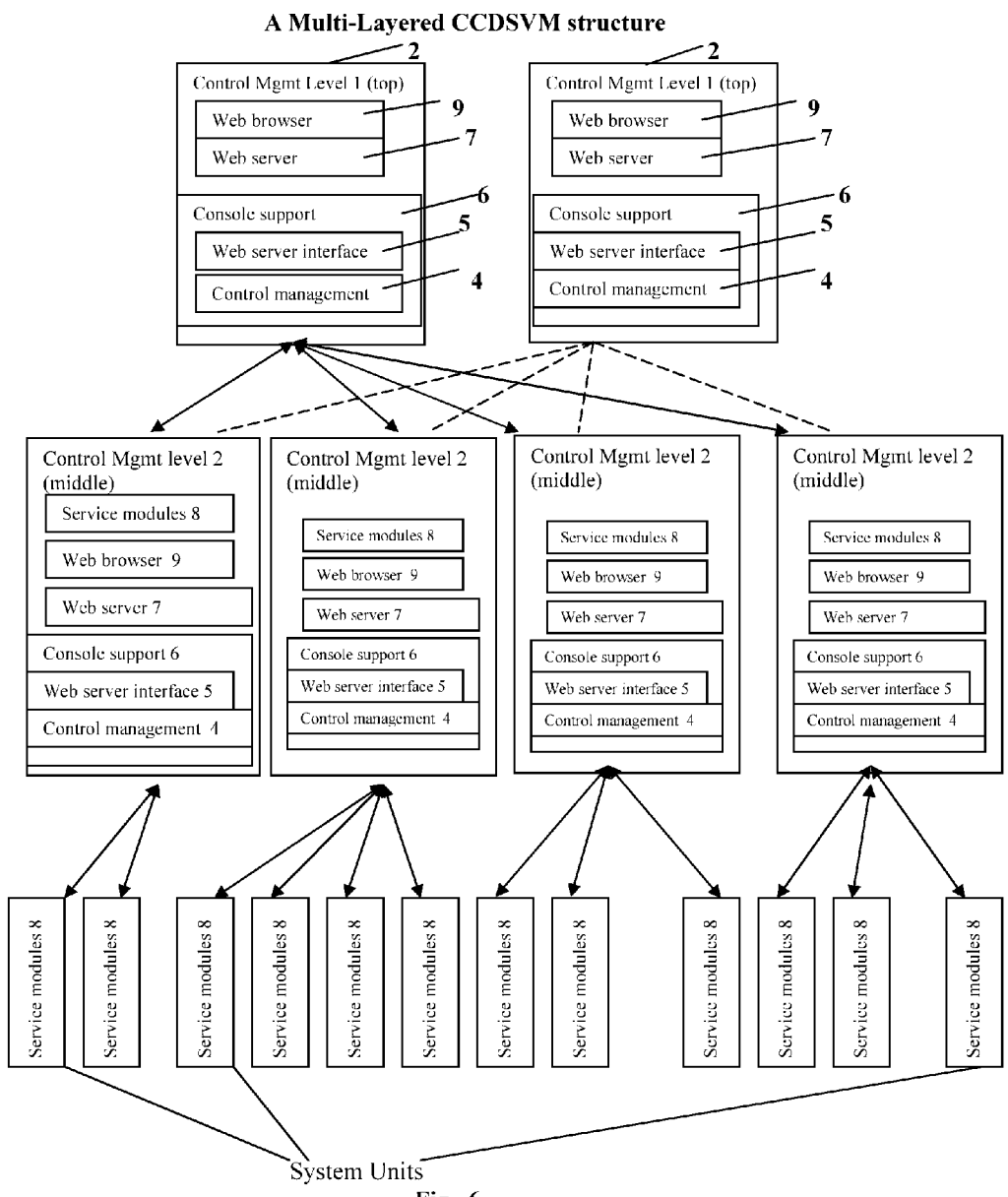
FIG. 6 illustrates one embodiment of a layered CCDSVM structure.

FIG. 6 illustrates another embodiment of a layered CCDSVM environment, which provides a flexible scalability mechanism to efficiently support thousands of heterogeneous system units 3. With this structure, a control management station 2 at middle layer 2 becomes a system unit 3 and is controlled by a control management station 2 at up layer 1.

Figure 7:
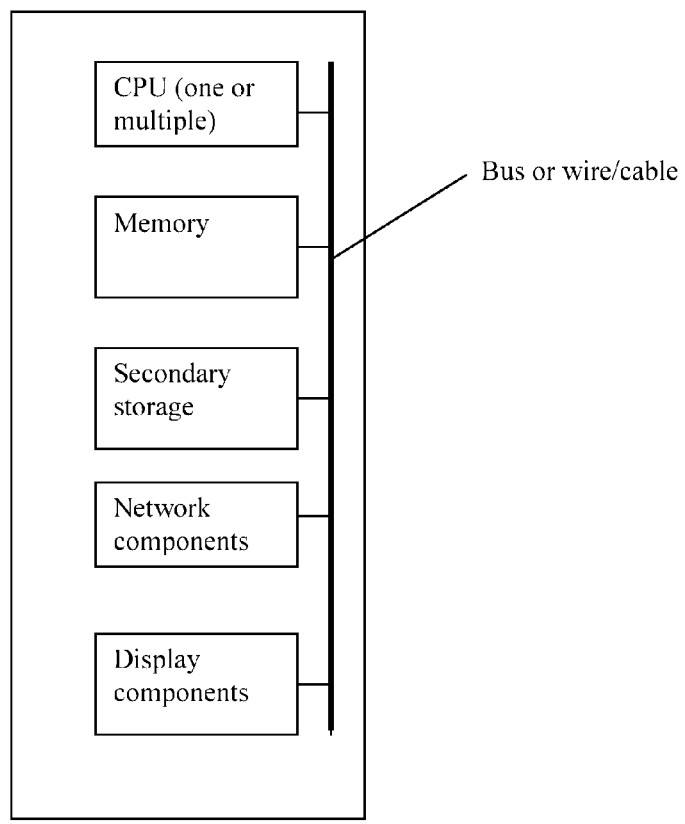
FIG. 7 illustrates an embodiment of typical hardware components for a computing device.

FIG. 7 illustrates a embodiment of typical hardware components for a computing device such as for the control management system 2, system units 3, and console hosts 1. The typical hardware components comprises of one or more CPU, memory, secondary storage such as disk drives and/or memory sticks, the network interface cards, and display components such as monitor or others. These components are connected internally through buses.

The detailed explanation of FIG. 2 will demonstrate how multiple concurrent tasks can be initiated from a web-console 9 and can be executed either on any one of the system units 3 or on the control management station 2 according to this invention.

In one example, a user A at a web-console 9 receives an authentication from the console supporting software 6. In one embodiment, a successfully login on the control management station 2 is considered an authentication because it authorizes the user named "A" access to the CCDSVM. Thereafter, the user "A" can obtain all necessary information about the system units 3 and the control management station 2 from the console supporting software 6. When the user A initiates a task for a selected target computing system, which is either a system unit 3 or the control management station 2, the task information is transmitted via the net 11 or 12 from the web-console 9 to the console support software 6 on the control management station 2.

A thread is created based on the console support software, 6 where the thread will serve and carry this task in the background. The created thread acquires a lock and stores the task information into a valid entry on a user level task list shown in FIG. 5. This is one of efforts to ensure that each of the multiple tasks can be initiated simultaneously and concurrently within the same web-console 9 of FIG. 2 without delaying, effecting or blocking in the web-console 9 screen and free from racing each other.

In addition, multiple web-consoles 9 for multiple concurrent users anywhere on the net 11 or 12 also can be supported. The obtained locks for this task will be properly released one at a time along with the task execution up to a point when the task is finally finished. Therefore, each task could be executed without time delay. Also, the stored task information will be removed upon the execution of the task is finished.

If total tasks initiated from the web-console 9 have succeeded the maximum tasks allowed by the console supporting software 6, the initiated task is failed. The locks will be released by the corresponding thread and the user A on the web-console 9 will be notified correspondingly via net.

If an existing task is in a stage of changing a resource object on a target system and if a newly created task will make change on the same resource object on that target system, the newly initiated task may fail or may have to wait until the previous task is finished. Further, if a task is failed, the locks associated with the task will be release by the thread and the user A on the web-console 9 will be notified across the network of 11 or 12 by the console support software 6.

The credential of executing a specific task on a specific target computing system submitted by the user A is checked, where an ordinary users' access & operation permissions and credentials are setup by administrator with supervisor or special privileges. If the user A is not permitted to perform any task on such target computing system or is not permitted to perform such task on any one of the computing systems in the CCDSVM, the task execution will fail and the user A will be notified. Otherwise, the task will be carried out by the corresponding thread on the target computing system that is either a control management station 2 or a system unit 3.

If there is a need, the console supporting software 6 will send the results or data back to the web-console 9. When the task is failed nor succeeded, the threads of the console supporting software 6 will release the locks acquired for this task.

If the task needs to be executed on the control management station 2, the thread created based on the console supporting software 6 will carry out this task. The threads of the console support software 6 also need to determine if they need to create another thread to execute this task. If there is a need, another thread will be created to execute this task. Once the task is finished, the corresponding locks will be released by the console supporting software 6.

If a task needs to be executed on a system unit 3, the console supporting software 6 will transmit the task information via the net2 12 to the service software module 8 of the target system unit 3. The thread based on the service software module 8 of the target system unit 3 will carry out this task. The service software module 8 on the target system unit 3 needs to determine if an additional thread needs to be created in order to execute such task. If there is a need, an additional thread is created to execute this task. Once the task is finished on the target system unit 3, the corresponding status of the task execution is transmitted back to the console supporting software 6 of the control management station 2. Upon receiving the task finished status, the locks associated with the thread of the console support software 6 for that task are released.

the Task Issued from Web-Console

The multiple concurrent tasks issued from a web-console 9 by a user could be any of the followings:

a) Move or transmit data such as a multiple gigabytes of file or other data in any form from any point or any computing system to another point or another computing system within the CCDSVM.

b) Configure, partition and assign entire storage system (raid/disk) within the CCDSVM.

c) Setup authentication for a specific user from a web-console on a specific console host with certain privilege for the entire CCDSVM or for a specific computing system, which could be any one of the system units 3 or a control management station 2. Setting up the steps of authentication process for any specific services configured in one or more specific system units 3.

d) Monitor and display activities and status for networks, storages, CPUs, processes and threads in the CCDSVM.

e) Create file system, file and directory structures, and support all other related data file operations on either the control management system 2 or the system units 3.

f) And all other types of tasks and operations that might be run in other OS (operating system) environment.

The capability of providing user with the multiple concurrent simultaneous operations and tasks on the web console 9 has indicated that this invention has created a web-based user work environment on top of an existing operating system for a single computing system or for multiple computing systems. Further, this is a consistent working environment for the operating system for a computing system since it allows a user access to exact the same working environment through the web-console 9, which could be a web browser residing either in the computing system or residing in a remote systems.

User Login

The user-login mechanism is also supported by the console supporting software 6. The web-console 9 obtains a login web page from the console supporting software 6 via the network of 11 & 12. Once the user provides an account name and a password via the login page displayed in the web-console 9 screen, the authentication information is sent to the console supporting software 6 for validation. Upon successful validating the user account and password information, the console support software 6 sends all necessary information such as IP address to the web-console 9, where the information also includes the information of the control management station 2 and system units 3.

The Maximum Tasks

The maximum multiple concurrent simultaneous tasks that can be initiated from the web-consoles 9 are determined by the console support software modules 6, and they are also determined based on the needs and the capacity of the control management station 2.

The Credential Checking

The credential of a user includes the permission to access all or partial computing systems or a single computing system within the CCDSVM. The credential further includes the permission to run all tasks or partial tasks that are listed in the previous section of "The Task Issued From Web-Console". It also includes the permission of accessing a specific size of storage volumes. For example, a user B may be granted a permission to run tasks over computing systems X, Y, and Z. Another user C may be granted a permission to run tasks over the entire computing systems in the CCDSVM environment. The user C might be allowed to get system status on the computing systems X, Y, and Z only while the user B may be allowed to run all tasks on the computing systems X, Y, and Z. Each computing system mentioned here could be a control management station 2 or any of system units 3. This basically represents a two-level authentication policy and checking. The first level is the security imposed on the control management station 2 and the second level is the security imposed on the system units (3 of FIG. 2).

The Web-Server Interface Software Modules

The web-server interfacing software module 5 is responsible to get information from or send information to the web server software 7. It also interacts with the control management modules 4 via inter-process communication and communicates with service module 8 of the system unit 3 via the net2 12.

The Control Management Software Modules

The control management modules 4 on the control management station 2 are responsible for communicating with the system units 3 for sending data to or receiving data from the system units via the net2 12. It also provides information of the system units 3 to the web interface software modules 5 of the control management station 2 via an inter-process communication mechanism.

The Layered CCDSVM Structure

To be more efficiently supporting multiple concurrent tasks over a larger number of the system units 3, the CCDSVM can be organized into a multi-layered structure as illustrated in FIG. 6. With this layered structure, the CCDSVM can be sub-divided into different groups. For example, each one of level-2 control management stations could function both as the control management station 2 for controlling the system units 3 below it and as a system unit 3 that is controlled by the level-1 control management station 2. Therefore, the level-2 control management station must be configure with related software modules for both the control management station 2 and the system unit 3.

What is claimed is:

1. A computing device comprising:
   at least one hardware processor, and
   a non-transitory computer-readable medium comprising program code which, when executed by the at least one hardware processor, cause the computing device to:
   connect to a remote device across a network;
   display, in a web browser executed on the computing device, information about files and allow a user selecting a first file from the information displayed and submitting a first request for transferring the first file; and
   process the first request for transferring the first file submitted by the user including to process the first request in the background and cause the displaying of the information about the files without being block in the web browser and allow the user selecting a second file from the information displayed and submitting a second request for transfer of the second file without waiting for completion of the first request for transferring the first file.

2. The computing device of claim 1, wherein the processing of the first request comprises:
   causing the computing device to send the first request to the remote device for the transfer of the first file to be carried out between the computing device and the remote device.

3. The computing device of claim 2, wherein said first file further resides in the remote device and the first file further is transferred from the remote device to the computing device upon the first request being processed.

4. The computing device of claim 2, wherein said first file further resides in the computing device, and the first file further is transferred from the computing device to the remote device upon the first request being processed.

5. The computing device of claim 1, wherein said processing of the first request comprises:
   storing information about the first request and invoking a lock protection to protect the storing before the processing of the first request in the background; and
   deleting the stored information about the first request in response to the completion of the first request.

6. The computing device of claim 1, wherein the program code further causes the computing device to process the second request for transferring the second file in the same way as to process the first request for transferring the first file.

7. A computer program product comprising:
   a non-transitory computer-readable medium in a first device comprising program instructions that, when executed by the first device, cause the first device to:
   connect to a second device across a network;
   display, in a web browser executed on the first device, information about files and allow a user selecting a first file from the information displayed and submitting a first request for transferring the first file; and
   process the first request for transferring the first file submitted by the user including to
   process the first request in the background and cause the displaying of the information about the files without being block in the web browser and allow the user selecting a second file from the information displayed and submitting a second request for transfer of the second file without waiting for completion of the first request for transferring the first file.

8. The program product of claim 7, wherein said program instructions causing first device to process the first request include causing the first device to send the first request to the second device for the transfer of the first file to be carried out between the second device and the first device.

9. The program product of claim 8, wherein said first file further resides in the first device, and the first file is transferred from the first device to the second device upon the first request being processed.

10. The program product of claim 8, wherein the first file further resides in the second device, and the first file is further transferred from the second device to the first device upon the first request being processed.

11. The program product of claim 7, wherein the program instructions causing the first device to process the first request include causing the first device to:
    store information about the first request and invoke a lock protection to protect the storing before the process of the first request in the background; and
    delete the stored information about the first request in response to the completion of the first request.

12. A method, for transferring files, comprising:
    connecting a first device to a second device across a network;
    displaying, in a web browser executed on the first device, information about files and allow a user to select a first file from the information displayed and submit a first request for transferring the first file; and
    processing, by the first device, the first request for transferring the first file submitted by the user, the processing of the first request including to process the first request in the background and cause the displaying of the information about the files without being block in the web browser and allow the user to select a second file from the information displayed and submit a second request for transferring the second file without waiting for completion of the first request for transferring the first file.

13. The method of claim 12, wherein the processing of the first request comprises:
    storing information about the first request and invoking a lock protection to protect the storing before the processing of the first request in the background; and
    deleting the stored information about the first request in response to the completion of the first request.

14. The method of claim 12, wherein said first file further resides in the first device, and the first file is transferred from the first device to the second device upon the first request being processed.

15. The method of claim 12, wherein said first file further resides in the second device, and the first file is transferred from the second device to the first device upon the first request being processed.

* * * * *